US 12,529,796 B2

(12) United States Patent
Okuyama et al.

(10) Patent No.: US 12,529,796 B2
(45) Date of Patent: Jan. 20, 2026

(54) OBJECT DETECTION DEVICE AND OBJECT DETECTION METHOD

(71) Applicant: Nuvoton Technology Corporation Japan, Kyoto (JP)

(72) Inventors: Tetsuro Okuyama, Osaka (JP); Yoshinao Kawai, Kyoto (JP); Masaki Kanemaru, Tokyo (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 60 days.

(21) Appl. No.: 18/408,397

(22) Filed: Jan. 9, 2024

(65) Prior Publication Data

US 2024/0142628 A1  May 2, 2024

Related U.S. Application Data

(63) Continuation of application No. PCT/JP2022/024738, filed on Jun. 21, 2022.

(30) Foreign Application Priority Data

Jul. 16, 2021  (JP) ................. 2021-118091

(51) Int. Cl.
*H04N 23/73* (2023.01)
*G01S 7/484* (2006.01)
*G01S 17/86* (2020.01)
*G01S 17/894* (2020.01)
(Continued)

(52) U.S. Cl.
CPC ............ *G01S 17/894* (2020.01); *G01S 7/484* (2013.01); *G01S 17/86* (2020.01); *H04N 13/207* (2018.05);
(Continued)

(58) Field of Classification Search
CPC ...... G01S 17/894; G01S 17/86; G01S 17/484; H04N 13/207; H04N 13/254; H04N 23/73; H04N 23/56; H04N 23/45
USPC .......................................................... 348/46
See application file for complete search history.

(56) References Cited

U.S. PATENT DOCUMENTS

| | | |
|---|---|---|
| 9,170,095 B1 | 10/2015 | Tachibana |
| 2019/0293791 A1 | 9/2019 | Iwai et al. |

(Continued)

FOREIGN PATENT DOCUMENTS

| | | |
|---|---|---|
| JP | 2007-122508 A | 5/2007 |
| JP | 2012-146132 A | 8/2012 |

(Continued)

OTHER PUBLICATIONS

JP 2018185179 Machine Translation (Year: 2018).*

(Continued)

*Primary Examiner* — Nguyen T Truong
(74) *Attorney, Agent, or Firm* — Rimon P.C.

(57) ABSTRACT

An object detection device includes: a light emitter that emits light; a sensor that generates a first pixel signal by exposure to reflected light according to a combination of emission by the light emitter and first exposure and a second pixel signal by exposure to reflected light according to a combination of the emission and second exposure; and a distance calculator that generates a distance image by ratio operation using the first pixel signal and the second pixel signal. Timing of the first exposure is set to timing during which the sensor is not exposed to reflected waves from an object included in a first section in which a distance from the object detection device is from 0 to a predetermined value. A time difference between the emission and the second exposure is greater than a time difference between the emission and the first exposure.

20 Claims, 7 Drawing Sheets

(51) Int. Cl.
*H04N 13/207* (2018.01)
*H04N 13/254* (2018.01)
*H04N 23/45* (2023.01)
*H04N 23/56* (2023.01)

(52) U.S. Cl.
CPC ........... *H04N 13/254* (2018.05); *H04N 23/45* (2023.01); *H04N 23/56* (2023.01); *H04N 23/73* (2023.01)

(56) References Cited

U.S. PATENT DOCUMENTS

2021/0165096 A1 6/2021 Kato et al.
2022/0120910 A1* 4/2022 Okuyama ............... G01S 17/36

FOREIGN PATENT DOCUMENTS

JP 2018-185179 A 11/2018
JP 2018185179 * 11/2018 ............. G01S 17/10
WO 2018/110183 A1 6/2018
WO WO-2021005659 A1 * 1/2021 ............. G01S 17/36

OTHER PUBLICATIONS

WO 2021005659 Machine Translation (Year: 2021).*
International Search Report (ISR) issued on Aug. 9, 2022 in International (PCT) Application No. PCT/JP2022/024738 w/English Translation.
Extended European Search Report dated Oct. 10, 2024 issued in the corresponding European Patent Application No. 22841886.9.

* cited by examiner

OBJECT DETECTION DEVICE AND OBJECT DETECTION METHOD

CROSS REFERENCE TO RELATED APPLICATIONS

This is a continuation application of PCT International Application No. PCT/JP2022/024738 filed on Jun. 21, 2022, designating the United States of America, which is based on and claims priority of Japanese Patent Application No. 2021-118091 filed on Jul. 16, 2021. The entire disclosures of the above-identified applications, including the specifications, drawings and claims are incorporated herein by reference in their entirety.

FIELD

The present disclosure relates to an object detection device and an object detection method for generating a distance image.

BACKGROUND

Patent Literature (PTL) 1 discloses an intruder detection device that reduces omission of extraction of pixels showing a moving object, by treating pixels whose distance measurement results differ between a background distance image and a target distance image in the same manner as pixels which have detected a distance change.

PTL 2 discloses a method for integrating three-dimensional data and two-dimensional image data to produce flexible and reliable recognition results by associating three-dimensional data, such as distance image data, and two-dimensional image data with each other and using the distance image data and the two-dimensional image data in a complementary manner. PTL 2 also discloses a robust monitoring/watch-over system using the method.

CITATION LIST

Patent Literature

PTL 1: Japanese Unexamined Patent Application Publication No. 2007-122508
PTL 2: Japanese Unexamined Patent Application Publication No. 2012-146132

SUMMARY

Technical Problem

However, when dust is present in the vicinity of the imaging direction, a lens flare occurs due to strong reflected light from the dust, resulting in generation of pixels whose distance values to the target are incorrect or pixels whose distance values cannot be calculated. Hereafter, a pixel whose distance value to the target is incorrect and a pixel whose distance value cannot be calculated are referred to as invalid pixels.

In view of the above, an object of the present disclosure is to provide an object detection device and an object detection method that inhibit generation of invalid pixels caused by dust in the vicinity.

Solution to Problem

To achieve the object described above, an object detection device according to an aspect of the present disclosure is an object detection device including: a light emitter that emits light; a sensor that generates a first pixel signal by exposure to reflected light according to a combination of emission by the light emitter and first exposure and a second pixel signal by exposure to reflected light according to a combination of the emission and second exposure; and a distance calculator that generates a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

An object detection method according to an aspect of the present disclosure is an object detection method for use in an object detection device including a light emitter that emits light and a sensor including a pixel that is exposed to reflected light, the object detection method including: generating a first pixel signal by exposure to reflected light according to a combination of emission by the light emitter and first exposure; generating a second pixel signal by exposure to reflected light according to a combination of the emission and second exposure; and generating a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

Note that these general comprehensive or specific aspects may be implemented as a system, a method, an integrated circuit, a computer program, a computer-readable recording medium such as a CD-ROM, or as any combination of systems, methods, integrated circuits, computer programs, and recording media.

Advantageous Effects

The object detection device and the object detection method according to the present disclosure are capable of inhibiting generation of invalid pixels caused by dust in the vicinity.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Underlying Knowledge Forming Basis of the Present Disclosure

The inventors have discovered the following problems with the object detection devices described in [Background Art].

When dust is present in the vicinity of the imaging direction of a camera included in the object detection device, a lens flare occurs due to strong reflected light from the dust, resulting in generation of invalid pixels whose distance values to the target are incorrect or whose distance values cannot be calculated.

Figure 5:
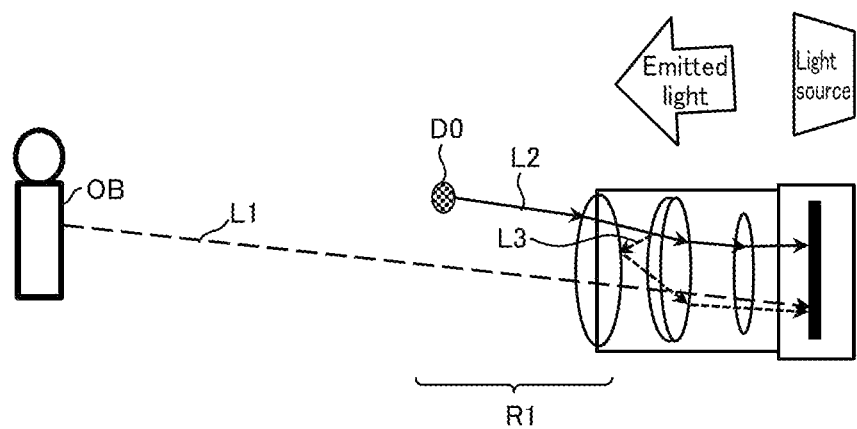
FIG. 5 is a diagram for describing a flare caused by dust.

FIG. 5 is a diagram for describing a lens flare caused by dust. The figure schematically illustrates a light source of an object detection device and a camera including a plurality of optical lenses and an image sensor. In the figure, emitted light from the light source reflects off object OB and dust D0 and returns to the camera as reflected light L1 and reflected light L2, respectively.

When the camera and dust D0 are far from each other, reflected light L2 is weak, thus reflected light L2 does not impact the imaging performed by the camera. However, when the camera and dust D0 are close to each other, reflected light L2 is strong. Strong reflected light L2 enters the image sensor and also generates reflected light L3 as a lens flare at the surfaces of the plurality of optical lenses. Part of reflected light L3 enters the image sensor and generates a ghost. The figure illustrates how reflected light L2 from dust D0 enters the image sensor, and also illustrates how reflected light L3 caused by a lens flare overlaps reflected light L1.

Figure 6:
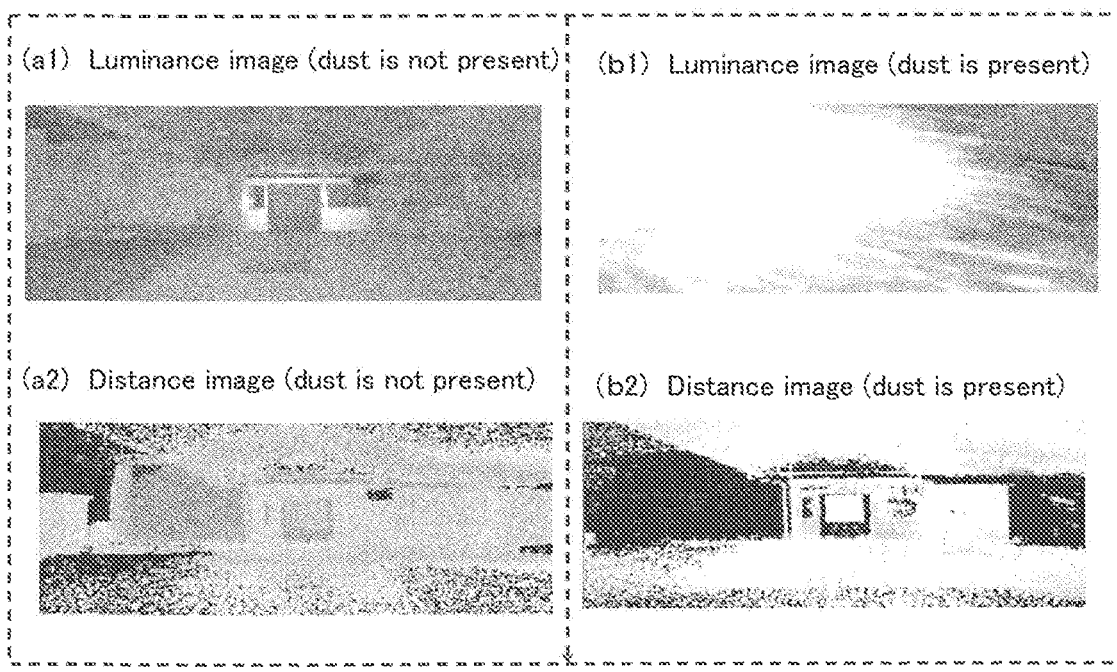
FIG. 6 is a diagram schematically illustrating luminance images and distance images when no dust is present and when dust is present.

FIG. 6 is a diagram schematically illustrating an example of luminance images and distance images when no dust is present and when dust is present. Part (a1) of the figure illustrates an example of a luminance image when no dust is present in the vicinity of the camera. This luminance image is an infrared image showing a road surface in front of an onboard camera, for example. In contrast, part (b1) of the figure illustrates an image showing the same road surface as that shown in part (a1), and illustrates an example of an infrared image when dust is rising in the vicinity of the camera.

Part (a2) of the figure illustrates an example of a distance image when no dust is present in the vicinity of the camera. This distance image is an image showing a road surface in front of an onboard camera, for example. Each pixel indicates a distance value rather than a luminance. In contrast, part (b2) of the figure illustrates a distance image showing the same road surface as that shown in part (a2), and illustrates an example of a distance image when dust is rising in the vicinity of the camera.

In the luminance image illustrated in part (b1) of the figure, as compared to part (a1), many pixels indicating incorrect luminance values are generated in a spotted pattern and are overlapping each other as a result of receiving strong reflected light from dust and reflected light caused by a lens flare. Pixels that constitute such spots can be said to be invalid pixels because they adversely impact the operation of detecting the presence or absence and type of a two-dimensional object from the luminance image.

In the distance image illustrated in part (b2) of the figure, as compared to part (a2), many pixels indicating incorrect distance values are generated in a spotted pattern and are overlapping each other as a result of receiving strong reflected light from dust and reflected light caused by a lens flare. In the distance image illustrated in part (b2), a flare caused by dust causes peripheral pixels other than pixels that have captured dust to turn into pixels indicating incorrect distance values. Pixels that constitute such spots can be said to be invalid pixels because they adversely impact the operation of detecting the position and size of a three-dimensional object from the distance image.

As can be understood from above, invalid pixels are generated when dust D0 is present in first section R1 in the vicinity of the camera's imaging direction. First section R1 in which invalid pixels are generated due to dust D0 depends on, for example, the intensity of the emitted light and the size of dust.

Figure 7:
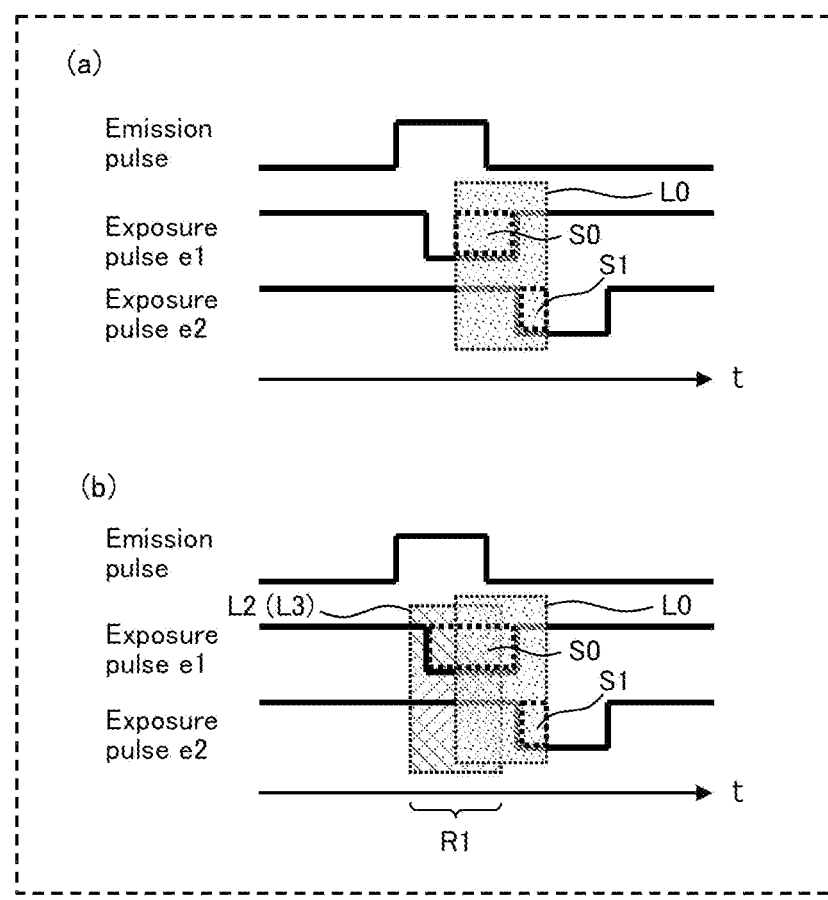
FIG. 7 is a diagram for describing impact of dust on a distance image.

FIG. 7 is a diagram for describing impact of dust on the distance image. The emission pulse in the figure indicates the timing of pulsed light emitted from the light source illustrated in FIG. 5. Exposure pulse e1 and exposure pulse e2 indicate the timing during which the image sensor is exposed to reflected light. The figure schematically illustrates timing of reflected light L0 from an object.

As illustrated in part (a) of FIG. 7, the image sensor generates first pixel signal S0 from reflected light L0 according to the combination of the emission pulse and exposure pulse e1. The image sensor also generates second pixel signal S1 from reflected light L0 according to the combination of the emission pulse and exposure pulse e2. With the Time of Flight (TOF) method, the distance value of a pixel can be calculated by ratio operation using first pixel signal S0 and second pixel signal S1.

In contrast, as illustrated in part (b) of FIG. 7, when reflected light L2 from dust D0 or reflected light L3 caused by a lens flare overlaps reflected light L0 from the object, correct pixel signal S0 cannot be obtained. As a result, the distance values of pixels calculated by ratio operation become incorrect.

As can be seen from above, when dust is present in the vicinity of the camera, a lens flare occurs due to strong reflected light from the dust, resulting in generation of invalid pixels whose distance values to the target are incorrect or whose distance values cannot be calculated. In addition to when dust is present, invalid pixels may be generated also when part of a vehicle body in which the object detection device is provided is included in the angle of view and strong reflected light from the part of the vehicle body is generated.

To solve such problems, an object detection device according to an embodiment is an object detection device including: a light emitter that emits light; a sensor that generates a first pixel signal by exposure to reflected light according to a combination of emission by the light emitter and first exposure and a second pixel signal by exposure to reflected light according to a combination of the emission and second exposure; and a distance calculator that generates a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

Accordingly, it is possible to inhibit generation of invalid pixels caused by dust in the vicinity of the imaging direction.

An object detection method according to an aspect of the present disclosure is an object detection method for use in an object detection device including a light emitter that emits light and a sensor including a pixel that is exposed to reflected light, the object detection method including: generating a first pixel signal by exposure to reflected light according to a combination of emission by the light emitter and first exposure; generating a second pixel signal by exposure to reflected light according to a combination of the emission and second exposure; and generating a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

Accordingly, it is possible to inhibit generation of invalid pixels caused by dust in the vicinity of the imaging direction.

Note that these general comprehensive or specific aspects may be implemented as a system, a method, an integrated circuit, a computer program, a computer-readable recording medium such as a CD-ROM, or as any combination of systems, methods, integrated circuits, computer programs, or recording media.

Hereinafter, an embodiment of the object detection device and the object detection method according to an aspect of the present disclosure will be specifically described with reference to the drawings.

Note that the embodiment described below illustrates a comprehensive or specific example of the present disclosure. The numerical values, shapes, materials, constituent elements, the arrangement and connection of the constituent elements, steps, the processing order of the steps, etc. illustrated in the embodiment below are mere examples, and are therefore not intended to limit the present disclosure. Among the constituent elements in the embodiment described below, those not recited in any of the independent claims will be described as optional constituent elements.

Embodiment

The present embodiment describes a configuration example in which an object detection device is provided in a mobile body. Here, the mobile body includes, for example, a vehicle such as an automobile, a farm machine, and a two-wheeled vehicle, a boat or a ship, and an aircraft such as a drone.

[1. Configuration]

Figure 1:
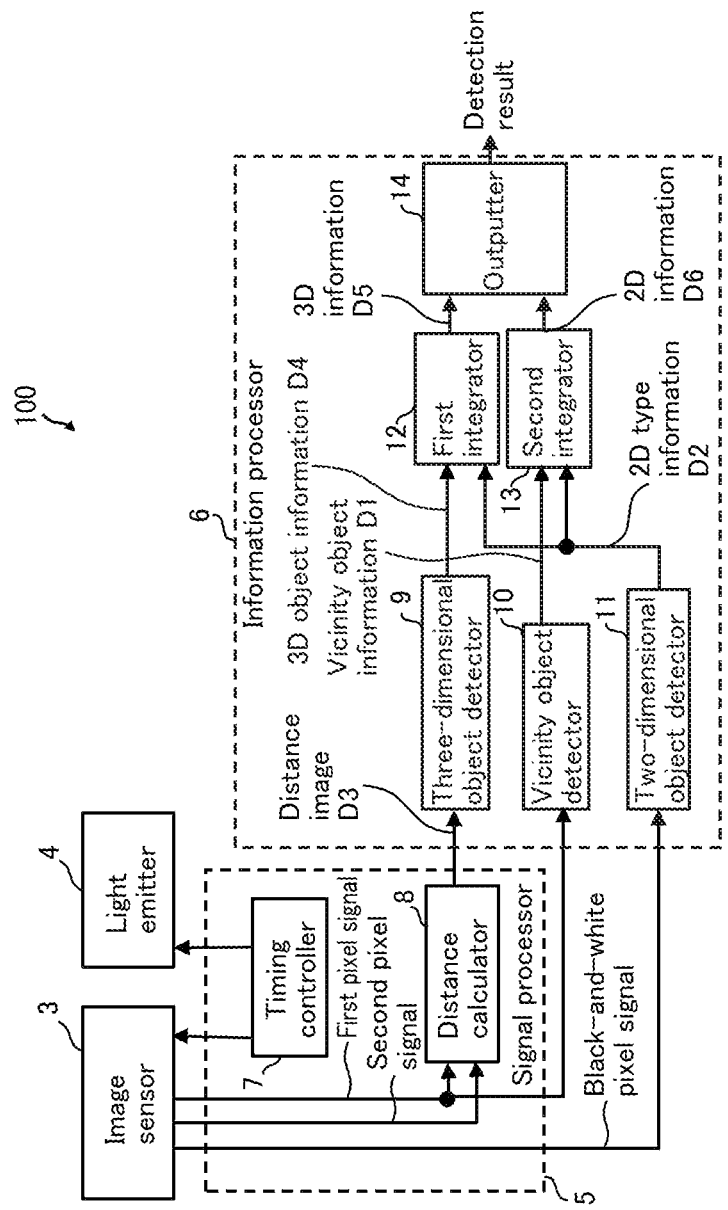
FIG. 1 is a block diagram illustrating a configuration example of an object detection device according to an embodiment.

First, a configuration of object detection device 100 according to the present embodiment will be described. FIG. 1 is a block diagram illustrating a configuration example of object detection device 100 according to the embodiment. Object detection device 100 in the figure includes light emitter 4, image sensor 3, signal processor 5, and information processor 6.

Light emitter 4 emits pulsed light that is infrared light according to an emission control signal provided from signal processor 5. For example, an element with a relatively high response speed and a high blinking speed such as a light-emitting diode (LED) or a laser diode is used as light emitter 4.

Figure 2:
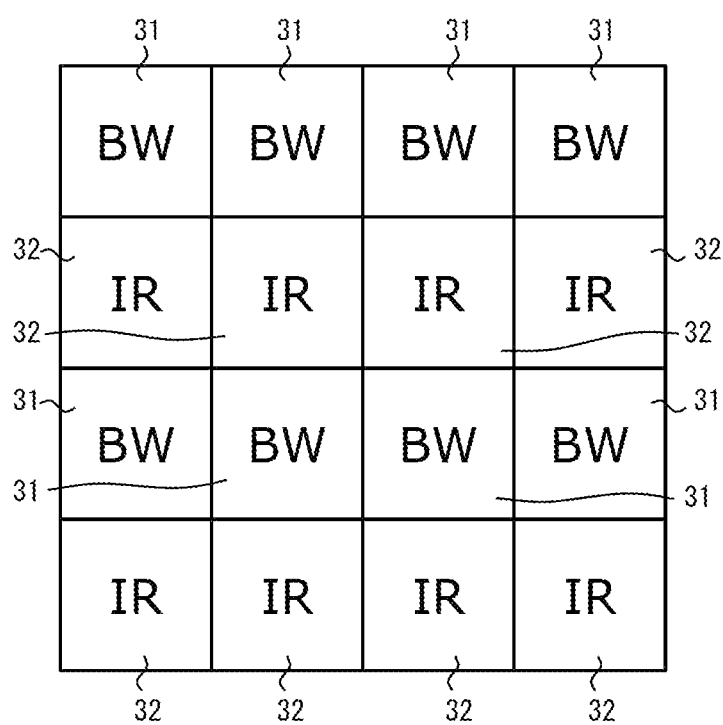
FIG. 2 is a diagram illustrating a pixel array example of an image sensor according to the embodiment.

Image sensor 3 is a solid-state imaging device that includes a plurality of pixels arranged in a matrix. FIG. 2 illustrates an example of the pixel array of image sensor 3. In FIG. 2, image sensor 3 includes first pixels 31 and second pixels 32. In FIG. 2, first pixels 31 sensitive to visible light are denoted by "BW" meaning black and white. An optical filter that reduces infrared light may be disposed on first pixels 31. Second pixels 32 sensitive to infrared light are denoted by "IR" meaning infrared. An optical filter that reduces visible light may be disposed on second pixels 32. Image sensor 3 generates a pixel signal by exposure according to an exposure control signal provided from signal processor 5. Specifically, image sensor 3 generates a first pixel signal using each second pixel 32 by exposure to reflected light according to a first exposure pulse of the exposure control signal. Likewise, image sensor 3 generates a second pixel signal using each second pixel 32 by exposure to reflected light according to a second exposure pulse of the exposure control signal. Also, image sensor 3 generates a black-and-white pixel signal using each first pixel 31 by exposure to visible light.

The pixel array of image sensor 3 is not limited to the one illustrated in FIG. 2. For example, first pixels 31 and second pixels 32 may be alternately arranged in the row direction. First pixels 31 and second pixels 32 may be alternately arranged in the row and column directions. In FIG. 2, the total number of rows of first pixels 31 and the total number of rows of second pixels 32 are the same, but may be different. Image sensor 3 may include R pixels sensitive to red light, G pixels sensitive to green light, B pixels sensitive to blue light, and IR pixels sensitive to infrared light. In that case, the R pixels, G pixels, B pixels, and IR pixels may be arranged in a square array. In addition to image sensor 3, a second image sensor that captures black-and-white images may be included. The second image sensor captures an image of the same subject as image sensor 3.

Signal processor 5 generates a distance image and two types of luminance images by controlling image sensor 3. Each pixel of the distance image indicates a distance value. The two types of luminance images are a black-and-white image based on the black-and-white pixel signals of first pixels 31 and an infrared image based on the first pixel signals. Signal processor 5 includes timing controller 7 and distance calculator 8.

Timing controller 7 generates an emission control signal that instructs light emitter 4 to emit light and an exposure control signal that instructs image sensor 3 to be exposed to light.

Distance calculator 8 generates distance image D3 by ratio operation using the first pixel signal and the second pixel signal provided from image sensor 3.

From signal processor 5, information processor 6 obtains distance image D3 as a three-dimensional image and obtains the black-and-white image and the infrared image as two-dimensional images, and detects objects captured in the images obtained. To do so, information processor 6 includes three-dimensional object detector 9, vicinity object detector 10, two-dimensional object detector 11, first integrator 12, second integrator 13, and outputter 14.

Vicinity object detector 10 obtains the first pixel signals from signal processor 5, generates a luminance image from the first pixel signals, and detects an object from the luminance image. The luminance image mentioned here is an infrared image. This infrared image is an image generated using reflected light from an object located at a distance less than the shortest distance indicated by distance image D3. Therefore, vicinity object detector 10 is capable of detecting the presence or absence of a closely-located object not included in distance image D3, and outputs vicinity object information D1 as the detection result.

Two-dimensional object detector 11 obtains black-and-white pixel signals from signal processor 5, generates a black-and-white image from the black-and-white pixel signals, and detects an object in the black-and-white image and the type of the object. For example, two-dimensional object detector 11 uses artificial intelligence (AI) to detect an object from the black-and-white image, determine whether the detected object is a target (e.g., a person or a car) of the object detectors, and generate 2D type information D2 indicating the type of the object determined.

Instead of obtaining black-and-white pixel signals from signal processor 5, two-dimensional object detector 11 may obtain a black-and-white image from the second image sensor described above.

First integrator 12 integrates 3D object information D4 provided from three-dimensional object detector 9 and 2D type information D2 provided from two-dimensional object detector 11, and outputs the integration result as 3D information D5. For example, 3D information D5 indicates the three-dimensional position, distance, size, and type of the object detected. First integrator 12 may integrate 3D object information D4 and 2D type information D2 under OR conditions, AND conditions, or a combination of OR and AND conditions. It suffices if the method of integration is determined according to the properties of distance image D3 and the black-and-white image.

Second integrator 13 integrates vicinity object information D1 provided from vicinity object detector 10 and 2D type information D2 provided from two-dimensional object detector 11, and outputs the integration result as 2D information D6. 2D information D6 indicates the two-dimensional position and type of the object detected. Vicinity object information D1 and 2D type information D2 may be integrated under OR conditions, AND conditions, or a combination of OR and AND conditions. It suffices if the method of integration is determined according to the properties of the infrared image and the black-and-white image.

Outputter 14 outputs 3D information D5 provided from first integrator 12 and the 2D information provided from second integrator 13 as detection results.

Note that information processor 6 may be configured as a computer system including one or more processors and one or more memories. This computer system may be any one of a system on a chip (SoC), a server, or cloud computing. The processor implements the functions of information processor 6 by executing a program recorded on a memory. The program may be recorded on a memory in advance, may be provided after being recorded on a non-transitory recording medium such as a memory card, or may be provided through a telecommunication line. In other words, the above program is a program for causing one or more processors to function as information processor 6.

Three-dimensional object detector 9 detects an object from distance image D3 and generates 3D object information D4 indicating the position and size of the object. For example, three-dimensional object detector 9 may detect an object by converting distance image D3 into point group data expressed in xyz three-dimensional coordinates and searching for a set of points within a certain range in the point group data.

[2.1 Distance Measurement Operation]

Next, distance measurement operation of object detection device 100 will be described.

Figure 3:
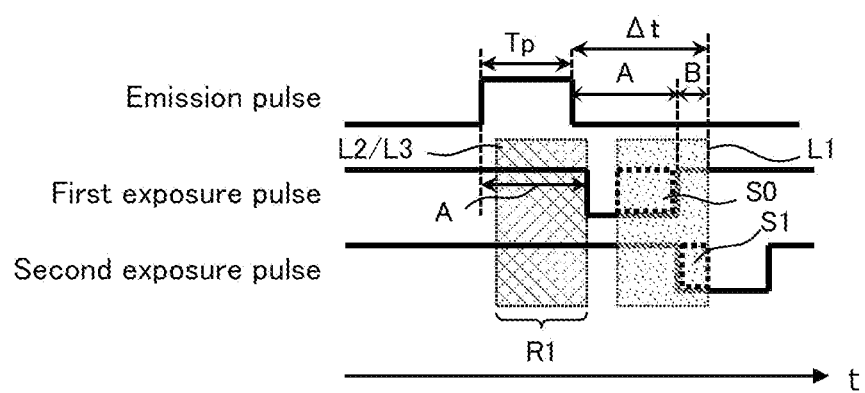
FIG. 3 is a timing chart illustrating an operation example of the object detection device according to the embodiment.

FIG. 3 is a timing chart illustrating an operation example of object detection device 100 according to the embodiment. The combination of an emission pulse and a first exposure pulse and the combination of the emission pulse and a second exposure pulse in the figure show different exposure operations. For convenience of explanation, the two exposure operations are illustrated together in the figure. Also illustrated is an example of the timing of reflected light L1 from an object and the timing of reflected light L2 from dust or reflected light L3 caused by a flare.

The "emission pulse" indicates the emission pulse included in the emission control signal provided from timing controller 7 to light emitter 4. It is assumed that the emission pulse is positive logic and that light emitter 4 emits pulsed light during the high-level section. The pulse width of the pulsed light is assumed to be Tp. Note that the emission pulse may be a negative logic signal.

The "first exposure pulse" indicates the first exposure pulse included in the exposure control signal provided from timing controller 7 to image sensor 3. It is assumed that the first exposure pulse is negative logic and that image sensor 3 is exposed during the low-level section. The timing of the first exposure pulse is set to the timing during which image sensor 3 is not exposed to the reflected light from the object included in first section R1 in which the distance from object detection device 100 is from 0 to a predetermined value. In other words, time A between the start timing of the emission pulse and the start timing of the first exposure pulse is set to time during which image sensor 3 is not exposed to strong reflected light from dust in the vicinity, as illustrated in FIG. 3. Note that the first exposure pulse may be a positive logic signal.

First section R1 in which the distance described above is from 0 to the predetermined value is a distance section in which strong reflected light from dust returns as illustrated in FIG. 6. In other words, first section R1 is a distance section in which impact of dust is unignorable. The predetermined value and first section R1 described above are not fixed and depend on the environment, such as the intensity and pulse width Tp of the pulsed light emitted by light emitter 4 and the brightness at which image sensor 3 captures images. The predetermined value described above may range, for example, from several tens of centimeters to approximately 1 meter. As with the predetermined value, time A described above also depends on the environment and thus may be dynamically set to an appropriate value.

The "second exposure pulse" indicates the second exposure pulse included in the exposure control signal provided from timing controller 7 to image sensor 3. It is assumed that the second exposure pulse is negative logic and that image sensor 3 is exposed during the low-level section. Note that the second exposure pulse may be a positive logic signal. In FIG. 3, it is assumed that the emission pulse, the first exposure pulse, and the second exposure pulse have the same pulse width Tp. The time from the end timing of the pulsed light to the start timing of the second exposure pulse is the same as the time from the end timing of the pulsed light to the end timing of the first exposure pulse. In other words, the time from the start timing of the emission pulse to the start timing of the second exposure pulse is Tp+A.

Distance z is calculated, for example, by the ratio operation shown in Equation 1.

$$z = (c \times \Delta t)/2 \qquad \text{(Equation 1)}$$
$$= (c \times A + c \times B)/2$$
$$= \{c \times A + c \times (S1/(S0 + S1))\}/2$$

Here, c denotes the speed of light. Δt denotes the time it takes for the pulsed light emitted from light emitter 4 to be reflected by an object and return to image sensor 3. At can be expressed as A+B. A denotes the time from the start timing of the emission pulse to the start timing of the first exposure pulse and is known. B is unknown but is calculated based on S0 and S1. S0 denotes the first pixel signal generated by the exposure according to the first exposure pulse. S1 denotes the second pixel signal generated by the exposure according to the second exposure pulse.

In the timing chart in FIG. 3, first section R1 is excluded from the period of the exposure pulse, and it is thus possible to inhibit the generation of invalid pixels caused by dust in the vicinity of the imaging direction. In FIG. 6, the distance section in which delay time Δt of reflected light L1 is time A or less is a distance-unmeasurable section. This results in a disadvantage that an object included in the distance-unmeasurable section cannot be detected from the distance image. Vicinity object detector 10 and two-dimensional object detector 11 perform operations to overcome this disadvantage. That is to say, vicinity object detector 10 generates a luminance image from the first pixel signals and detects an object from the luminance image. Two-dimensional object detector 11 obtains a black-and-white image, which is a two-dimensional image, and detects an object in the two-dimensional image and the type of the object.

Although Equation 1 shows a ratio operation which ignores background light, object detection device 100 may generate background light signal BG indicating the magnitude of background light by exposure with no reflected light, subtract background light signal BG from each of first pixel signal S0 and second pixel signal S1, and then perform the ratio operation in Equation 1.

[2.2 Operation]

Next, an object detection method for use in object detection device 100 will be described.

Figure 4:
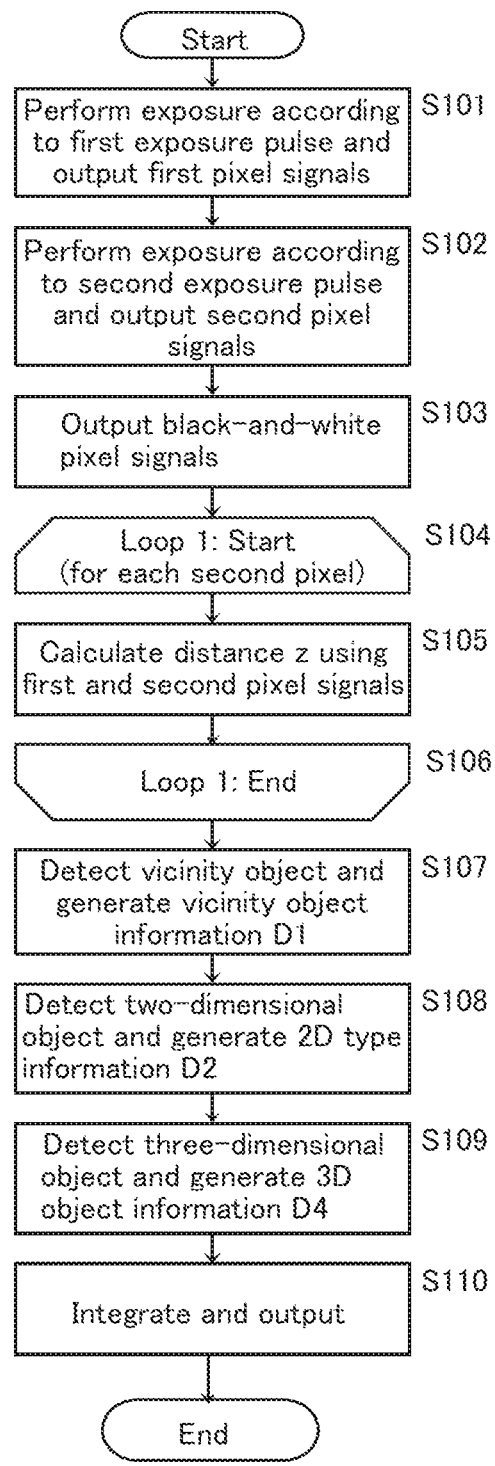
FIG. 4 is a flow chart illustrating an example of an object detection method according to the embodiment.

FIG. 4 is a flow chart illustrating an example of the object detection method according to the embodiment. As illustrated in the figure, object detection device 100 first outputs first pixel signals corresponding to the plurality of second pixels 32 by exposing image sensor 3 to reflected light according to the combination of the pulsed light and the first exposure pulse (S101). Further, object detection device 100 outputs second pixel signals corresponding to the plurality of second pixels 32 by exposing image sensor 3 to reflected light according to the combination of the pulsed light and the second exposure pulse (S102). Furthermore, image sensor 3 in object detection device 100 outputs a black-and-white pixel signal from each of the plurality of first pixels 31 (S103). Note that when image sensor 3 is a single sensor (solid-state imaging device), the exposure in steps S101 and S102 is global exposure (or global shutter function) where all pixels are exposed simultaneously. Note that the first pixel signal may be an integrated value obtained by exposure performed twice or more according to the first exposure pulse. Likewise, the second pixel signal may be an integrated value obtained by exposure performed twice or more according to the second exposure pulse.

Furthermore, object detection device 100 calculates distance z for each of the plurality of second pixels 32 using first pixel signal S0 and second pixel signal S1 according to Equation 1 shown above (S104 to S106). With this, distance calculator 8 generates distance image D3 whose pixel values are distances z.

Next, object detection device 100 generates a luminance image from the first pixel signals and detects an object from the luminance image. This luminance image is an infrared image generated by exposure according to the first exposure pulse. An object in the distance-unmeasurable section, that is, an object in the vicinity of object detection device 100, is detected, and vicinity object information D1 is generated as the detection result (S107).

Further, object detection device 100 detects a two-dimensional object and its type from a black-and-white image and generates 2D type information D2 as the detection result (S108).

Furthermore, object detection device 100 detects a three-dimensional object from distance image D3 and generates 3D object information D4 as the detection result (S109).

After that, object detection device 100 integrates and outputs vicinity object information D1, 2D type information D2, and 3D object information D4 by using first integrator 12, second integrator 13, and outputter 14 (S110).

Note that steps S101 to S103 may be in a different order. Steps S107 to S109 may also be in a different order.

With the above method, it is possible to generate a distance measurement image that is unaffected by dust in the vicinity of the imaging direction, thus inhibiting degradation of the object detection accuracy caused by dust.

Although an indirect TOF (iTOF) method that uses pulsed light has been illustrated as an example of the distance measurement method used by image sensor 3, the present disclosure is not limited to this method. For example, image sensor 3 may use a direct TOF (dTOF) method that uses pulsed light or a continuous wave-iTOF (CW-iTOF) method that also uses periodic light (e.g., sinusoidal laser light).

[3. Conclusion]

As described above, the object detection device according to the embodiment is an object detection device including: a light emitter that emits light; a sensor that generates a first pixel signal by exposure to reflected light according to a combination of emission by the light emitter and first exposure and a second pixel signal by exposure to reflected light according to a combination of the emission and second exposure; and a distance calculator that generates a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

Accordingly, it is possible to inhibit generation of invalid pixels caused by dust in the vicinity of the imaging direction.

For example, the object detection device may include a three-dimensional object detector that detects an object from the distance image.

Accordingly, it is also possible to detect an object from the distance image.

For example, the object detection device may include: a two-dimensional object detector that obtains a first luminance image including an imaging target identical to an imaging target included in the distance image, and detects an object in the first luminance image; and a first integrator that integrates a detection result of the three-dimensional object detector and a detection result of the two-dimensional object detector. The first luminance image may be, for example, the black-and-white image described above.

Accordingly, the integration makes it possible to improve the object detection accuracy.

For example, the object detection device may include: a vicinity object detector that generates a second luminance image from the first pixel signal and detects an object from the second luminance image.

Accordingly, it is also possible to detect an object in the vicinity of the imaging direction.

For example, the object detection device may include: a two-dimensional object detector that obtains a first luminance image including an imaging target identical to an imaging target included in the distance image, and detects an object in the first luminance image; and a second integrator that integrates a detection result of the vicinity object detector and a detection result of the two-dimensional object detector.

Accordingly, the integration makes it possible to improve the object detection accuracy.

For example, the object detection device may include: a three-dimensional object detector that detects an object from the distance image; a first integrator that integrates a detection result of the three-dimensional object detector and the detection result of the two-dimensional object detector; and an outputter that outputs an integration result of the first integrator and an integration result of the second integrator as a detection result.

Accordingly, the integration makes it possible to further improve the object detection accuracy.

For example, as the emission, the light emitter may emit pulsed light.

Accordingly, it is possible to use a distance measurement sensor which employs the TOF method that uses pulsed light.

For example, the sensor that generates the first pixel signal and the second pixel signal may be an image sensor that includes a plurality of pixels.

Accordingly, an image sensor can be used as the sensor.

For example, the object detection device may include: an image sensor that generates the first luminance image.

Accordingly, it is possible to use an image sensor for the black-and-white image described above, in addition to the sensor used for the distance image and luminance images described above.

For example, the sensor may generate the first luminance image.

Accordingly, since the black-and-white image, distance image, and luminance images described above are generated by a single sensor, the object detection device is suitable for size reduction.

An object detection method according to an aspect of the present disclosure is an object detection method for use in an object detection device including a light emitter that emits light and a sensor including a pixel that is exposed to reflected light, the object detection method including: generating a first pixel signal by exposure to reflected light according to a combination of emission by the light emitter and first exposure; generating a second pixel signal by exposure to reflected light according to a combination of the emission and second exposure; and generating a distance image by ratio operation using the first pixel signal and the second pixel signal, wherein timing of the first exposure is set to timing during which the sensor is not exposed to reflected waves from an object included in a first section in which a distance from the object detection device is from 0 to a predetermined value, and a time difference between the emission and the second exposure is greater than a time difference between the emission and the first exposure.

Accordingly, it is possible to inhibit generation of invalid pixels caused by dust in the vicinity of the imaging direction.

Object detection device 100 according to the embodiment includes: light emitter 4 that emits pulsed light; image sensor 3 that includes a plurality of pixels, generates a first pixel signal by exposure to reflected light according to a combination of the pulsed light and a first exposure pulse, and generates a second pixel signal by exposure to reflected light according to a combination of the pulsed light and a second exposure pulse; distance calculator 8 that generates distance image D3 by ratio operation using the first pixel signal and the second pixel signal; and vicinity object detector 10 that generates a luminance image from the first pixel signal and detects an object from the luminance image. Timing of the first exposure pulse is set to timing during which image sensor 3 is not exposed to reflected waves from an object included in first section R1 in which a distance from object detection device 100 is from 0 to a predetermined value. A time difference between the pulsed light and the second exposure pulse is greater than a time difference between the pulsed light and the first exposure pulse.

Accordingly, it is possible to inhibit generation of invalid pixels caused by dust in the vicinity of the imaging direction. Moreover, it is possible to detect an object in the vicinity of the imaging direction.

For example, the start timing of the first exposure pulse may be later than the end timing of the pulsed light.

Accordingly, it is possible to more reliably inhibit generation of invalid pixels caused by dust in the vicinity.

For example, the distance indicated by distance image D3 may indicate farther than first section R1, and need not indicate the distance corresponding to first section R1.

Accordingly, it is possible to more reliably inhibit the impact of dust in the vicinity of the imaging direction on distance image D3.

For example, object detection device 100 may include timing controller 7 that generates the first exposure pulse and the second exposure pulse in synchronization with the pulsed light, and timing controller 7 need not generate exposure pulses that overlap the pulsed light.

Accordingly, since image sensor 3 is not exposed to reflected light from dust in the vicinity of the imaging direction, it is possible to inhibit generation of invalid pixels.

For example, the time from the end timing of the pulsed light to the start timing of the second exposure pulse may be the same as the time from the end timing of the pulsed light to the end timing of the first exposure pulse.

Accordingly, it is possible to generate a distance measurement image that is unaffected by dust in the vicinity of the imaging direction.

For example, object detection device 100 may include: two-dimensional object detector 11 that obtains a two-dimensional image generated by image sensor 3 and detects an object in the two-dimensional image; and an integrator (e.g., first integrator 12) that integrates the detection result of vicinity object detector 10 and the detection result of two-dimensional object detector 11.

Accordingly, it is possible to detect an object from the two-dimensional image without the impact of dust.

For example, two-dimensional object detector 11 may generate type information of the object detected.

Accordingly, it is possible to detect the type of the object from the two-dimensional image without the impact of dust.

Accordingly, it is possible to accurately detect the type information of the object without the impact of dust.

For example, object detection device 100 may include three-dimensional object detector 9 that detects an object from a distance image and generates three-dimensional information of the object, and the integrator (e.g., first integrator 12 and second integrator 13) may integrate the detection result of vicinity object detector 10, the detection result of two-dimensional object detector 11, and the detection result of three-dimensional object detector 9.

Accordingly, it is possible to accurately detect the three-dimensional information indicating, for example, the position and size of the object without the impact of dust.

An object detection method according to an aspect of the present disclosure is an object detection method for use in object detection device 100 including light emitter 4 that emits pulsed light and image sensor 3 including pixels that are exposed to reflected light of the pulsed light. The object detection method includes: generating a first pixel signal for each pixel by image sensor 3 being exposed to reflected light according to a combination of the pulsed light and a first exposure pulse; generating a second pixel signal for each pixel by image sensor 3 being exposed to reflected light according to a combination of the pulsed light and a second exposure pulse; generating a distance image by ratio operation using the first pixel signal and the second pixel signal; generating a luminance image from the first pixel signal; and detecting an object from the luminance image. Timing of the first exposure pulse is set to timing during which image sensor 3 is not exposed to reflected waves from an object included in a first section in which a distance from object detection device 100 is from 0 to a predetermined value. A time difference between the pulsed light and the second exposure pulse is greater than a time difference between the pulsed light and the first exposure pulse.

Accordingly, it is possible to inhibit generation of invalid pixels caused by dust in the vicinity of the imaging direction. Moreover, it is also possible to detect an object in the vicinity of the imaging direction.

Note that in the embodiment described above, each constituent element may be configured as dedicated hardware or may be implemented by executing a software program suitable for the constituent element. Each constituent element may also be implemented by means of a program executing unit, such as a central processing unit (CPU) or a processor, reading and executing a software program recorded on a recording medium such as a hard disk or a semiconductor memory. Here, the software program for implementing, for example, the object detection device according to the embodiment described above is the program described below.

That is, this program causes a computer to execute the object detection method illustrated in FIG. 4.

Note that image sensor 3 may be of the charge coupled device (CCD) type or may be of the complementary metal oxide semiconductor (CMOS) type, so long as image sensor 3 has the global shutter function.

Image sensor 3 may include two solid-state imaging devices or may include three solid-state imaging devices instead of one solid-state imaging device. However, the solid-state imaging devices need to be able to associate with the pixel positions of the first pixel signal, the second pixel signal, and the black-and-white pixel signal.

Although object detection device 100 according to one or more aspects has been described above based on an embodiment, the present disclosure is not limited to this embodiment. Various modifications of the present embodiment as well as embodiments resulting from combinations of constituent elements from different embodiments that may be conceived by those skilled in the art are intended to be included within the scope of the one or more aspects of the present disclosure, so long as these do not depart from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to object detection device 100 that detects an object in a 2D image and a 3D image.

The invention claimed is:

1. An object detection device comprising:
a light emitter that emits light;
a sensor that generates a first pixel signal by exposure to reflected light according to a combination of emission by the light emitter and first exposure and a second pixel signal by exposure to reflected light according to a combination of the emission and second exposure; and
a distance calculator that generates a distance image by ratio operation using the first pixel signal and the second pixel signal,
wherein timing of the first exposure is set to timing during which the sensor is not exposed to reflected waves from a closely-located object included in a first section in which a distance from the object detection device is from 0 to a predetermined value,
a time difference between the emission and the second exposure is greater than a time difference between the emission and the first exposure, and
the object detection device further comprises a vicinity object detector that generates a first luminance image from the first pixel signal without using the second pixel signal and detects the closely-located object from the first luminance image.

2. The object detection device according to claim 1, comprising:
a three-dimensional object detector that detects a distanced object from the distance image.

3. The object detection device according to claim 2, comprising:
a two-dimensional object detector that obtains a second luminance image including an imaging target identical to an imaging target included in the distance image, and detects the distanced object in the second luminance image;
a first integrator that integrates a detection result of the three-dimensional object detector and a detection result of the two-dimensional object detector; and
an outputter that outputs, as a detection result, an integration result of the first integrator indicating a three-dimensional information of the distanced object.

4. The object detection device according to claim 1, comprising:
a two-dimensional object detector that obtains a second luminance image including an imaging target identical to an imaging target included in the distance image, and detects a distanced object in the second luminance image; and
a second integrator that integrates a detection result of the vicinity object detector and a detection result of the two-dimensional object detector;

an outputter that outputs, as a detection result, an integration result of the second integrator indicating two-dimensional information of at least one of the closely-located object or the distanced object.

5. The object detection device according to claim 4, comprising:
a three-dimensional object detector that detects the distanced object from the distance image; and
a first integrator that integrates a detection result of the three-dimensional object detector and the detection result of the two-dimensional object detector; wherein:
the outputter outputs an integration result of the first integrator indicating a three-dimensional information of the distanced object and the integration result of the second integrator, as a detection result.

6. The object detection device according to claim 1, wherein, as the emission, the light emitter emits pulsed light.

7. The object detection device according to claim 1, wherein the sensor that generates the first pixel signal and the second pixel signal is an image sensor that includes a plurality of pixels.

8. The object detection device according to claim 3, comprising:
an image sensor that generates the second luminance image.

9. The object detection device according to claim 3, wherein the sensor generates the second luminance image.

10. The object detection device according to claim 1, wherein the vicinity object detector detects the closely-located object located in the first section.

11. The object detection device according to claim 1, wherein the vicinity object detector detects the closely-located object located in the unmeasurable section where a distance to the closely-located object located therein cannot be measured by the distance image.

12. The object detection device according to claim 4, wherein the two-dimensional information indicates a two-dimensional position of the closely-located object located in the first section.

13. The object detection device according to claim 1, wherein the vicinity object detector generates the first luminance image only from the first pixel signal and detects the closely-located object from the first luminance image.

14. An object detection method for use in an object detection device including a light emitter that emits light and a sensor including a pixel that is exposed to reflected light, the object detection method comprising:
generating a first pixel signal by exposure to reflected light according to a combination of emission by the light emitter and first exposure;
generating a second pixel signal by exposure to reflected light according to a combination of the emission and second exposure;
generating a distance image by ratio operation using the first pixel signal and the second pixel signal; and
generating a first luminance image from the first pixel signal without using the second pixel signal and detects the closely-located object from the first luminance image,
wherein timing of the first exposure is set to timing during which the sensor is not exposed to reflected waves from the closely-located object included in a first section in which a distance from the object detection device is from 0 to a predetermined value, and
a time difference between the emission and the second exposure is greater than a time difference between the emission and the first exposure.

15. The object detection device according to claim 4, wherein the two-dimensional information indicates a two-dimensional position of the closely-located object located in the unmeasurable section where a distance to the closely-located object located therein cannot be measured by the distance image.

16. The object detection method according to claim 14, wherein the detecting the closely-located object comprises detecting the closely-located object located in the first section.

17. The object detection method according to claim 14, wherein the detecting the closely-located object comprises detecting the closely-located object located in the unmeasurable section where a distance to the closely-located object located therein cannot be measured by the distance image.

18. The object detection method according to claim 14, further comprising:
obtaining a second luminance image including an imaging target identical to an imaging target included in the distance image, and detecting a distanced object in the second luminance image;
integrating a detection result of the closely-located object and a detection result of the distanced object in the second luminance image; and
outputting an integration result indicating two-dimensional information of at least one of the closely-located object or the distanced object.

19. The object detection method according to claim 18, wherein the two-dimensional information indicates a two-dimensional position of the closely-located object located in the first section.

20. The object detection method according to claim 18, wherein the two-dimensional information indicates a two-dimensional position of the closely-located object located in the unmeasurable section where a distance to the closely-located object located therein cannot be measured by the distance image.

* * * * *